UNITED STATES PATENT OFFICE.

HEINRICH SEIDEL, OF VIENNA, AUSTRIA-HUNGARY.

MORDANT FROM SULFITE-CELLULOSE LYES.

SPECIFICATION forming part of Letters Patent No. 608,231, dated August 2, 1898.

Application filed September 10, 1897. Serial No. 651,245. (No specimens.) Patented in Austria March 5, 1897, No. 47/744.

*To all whom it may concern:*

Be it known that I, HEINRICH SEIDEL, a subject of the Emperor of Austria-Hungary, residing at Vienna, in the Province of Lower Austria, in the Empire of Austria-Hungary, have invented certain new and useful Improvements in Processes of Mordanting Fibrous Materials Preparatory to Dyeing the Same, (for which Letters Patent have been obtained in Austria, dated March 5, 1897, registered, Vol. 47, folio 744;) and I do hereby declare the following to be a full, clear, and exact description of the invention, such as will enable others skilled in the art to which it appertains to make and use the same.

My invention has relation to the art of mordanting fibrous materials as a prepartory step to dyeing the same; and my said invention has for its object a cheap yet reliable substitute for the organic reagents—such as tartar, tartar preparations, and lactic acid—commonly used in conjunction with a salt of a metal in the preparation of the mordanting liquor or bath.

I have discovered that a certain substance or compound obtainable from sulfite-cellulose lyes by salting out with a salt of a metal of the alkalies or of the alkaline earths has the same reactive properties in presence of the salts of metals commonly used in mordanting fibrous materials—as, for instance, a bichromate of sodium or of potassium or aluminium in the mordanting of wool—as the organic substances hereinabove referred to and that this substance or compound need not be first separated from the lye, so that these waste lyes themselves can be used or said lyes can be decolored and freed from calcium compounds before use in the preparation of the mordanting bath, or the lye can be first concentrated by evaporation and used in its concentrated state, or the lye can be evaporated to dryness and the dry residuum used as a substitute for said organic bodies, thus providing a very cheap substitute for such bodies, and at the same time I make use of an otherwise waste and troublesome product of the manufacture of cellulose.

Although the substance referred to and capable of being salted out of or otherwise separated from sulfite-cellulose lyes is well known, yet, notwithstanding repeated efforts made by the most eminent chemists as well as by myself, its exact chemical constitution has as yet not been definitely determined. From the researches of Carius, Schubert, Cross, and Bevan, Lindsay & Tollens, and Ulzer and myself I am of opinion that this body, or, more properly, compound, is probably a sulfo derivate of lignin, the exact chemical formula of which is yet to be established; but inasmuch as the substance or compound is well known, as well as the means for obtaining it from sulfite-cellulose lyes, and as these lyes themselves, before or after concentration or the residue resulting from the evaporation of such lyes to dryness, can be employed, as above stated, in lieu of the organic substances heretofore used in mordanting fibrous materials, and in view of the example to be given, any one skilled in the art of mordanting will be enabled to carry out my invention without having knowledge of the exact chemical constitution of this substitute, as such knowledge is not absolutely necessary to the carrying out of my said invention; but for the purposes of this specification and with a view to distinguishing the body or compound without thereby intending to define its exact nature or chemical composition I will call it a "sulfo derivate of lignin."

As an example, in illustration of the mode of carrying out my invention, I prepare a bath for mordanting sheep's wool as follows: I form a solution of the usual strength of potassium bichromate, for instance, with or without the addition thereto of sulfuric acid, and to this I add a suitable proportion of the sulfo derivate of lignin, which proportion will vary from five per cent. to ten per cent., according to the depth of the shade of color the fibrous material, as sheep's wool, is to have ultimately. Instead of the sulfo derivate of lignin sulfite-cellulose lye, which contains it, can be added to the solution of bichromate, or the lye so added can first be decolored and freed from calcium compounds and then added, or the lye or the decolored and purified lye can be concentrated by evaporation and added to the bichromate solution, or the residuum of the evaporation of the lye can be used, the proportions varying, of course, with the amount of sulfo derivate of lignin contained in the lye or the concentrated lye or the dry residuum, and this is readily determinable from the lye itself. Into this bath the previously-wetted wool is then placed and left for about one and one-fourth hours, when it may be withdrawn and dyed in the usual manner.

The mordanting bath can be prepared at normal temperatures, because the dry residuum resulting from the evaporation of the sulfite lye, as well as the salted-out sulfo derivate of lignin, are both readily soluble in water of normal temperature, as is well known.

Having thus described my invention, what I claim as new therein, and desire to secure by Letters Patent, is—

1. A mordanting bath consisting of a solution of a salt of a metal of the alkalies or alkaline earths and of the described sulfo derivate of lignin, substantially as set forth.

2. A mordanting bath consisting of a solution of a salt of a metal of the alkalies or alkaline earths of a mineral acid, and of the described sulfo derivate of lignin, substantially as set forth.

In testimony whereof I affix my signature in presence of two witnesses.

HEINRICH SEIDEL.

Witnesses:
 HARRY BELMONT,
 DAVID ODBIN.